United States Patent [19]

Gibson et al.

[11] Patent Number: 6,015,767

[45] Date of Patent: Jan. 18, 2000

[54] SUPPORTED POLYMERISATION CATALYSTS

[75] Inventors: Vernon Charles Gibson, London; Warren Reed, Sunbury-on-Thames, both of United Kingdom

[73] Assignee: BP Chemicals Limited, London, United Kingdom

[21] Appl. No.: 08/886,454

[22] Filed: Jul. 1, 1997

[30] Foreign Application Priority Data

Jul. 2, 1996 [GB] United Kingdom .................... 9613814

[51] Int. Cl.⁷ .............................. B01J 31/00; B01J 31/06
[52] U.S. Cl. ........................ 502/152; 502/102; 502/103; 502/117; 526/943
[58] Field of Search ............................. 502/102, 103, 502/117, 152; 526/943

[56] References Cited

U.S. PATENT DOCUMENTS 5,362,824  11/1994  Furtek et al. .
5,461,017  10/1995  Furtek et al. .

FOREIGN PATENT DOCUMENTS

| | | |
|---|---|---|
| 128045A | 12/1984 | European Pat. Off. . |
| 285443A | 3/1987 | European Pat. Off. . |
| 519236A2 | 12/1992 | European Pat. Off. . |
| 563917A1 | 10/1993 | European Pat. Off. . |
| 3213504 | 9/1988 | Japan . |
| 1066214 | 3/1989 | Japan . |
| 2173104 | 7/1990 | Japan . |
| 4031403 | 2/1992 | Japan . |
| 6087923 | 3/1994 | Japan . |
| WO 88/08432 | 11/1988 | WIPO . |
| WO 91/09882 | 7/1991 | WIPO . |
| WO 93/11172 | 6/1993 | WIPO . |
| WO 94/26793 | 11/1994 | WIPO . |
| WO 95/07140 | 3/1995 | WIPO . |
| WO 95/07939 | 3/1995 | WIPO . |
| WO 95/15815 | 6/1995 | WIPO . |
| WO 95/21874 | 8/1995 | WIPO . |
| WO 95/23816 | 9/1995 | WIPO . |
| WO 95/25129 | 9/1995 | WIPO . |

Primary Examiner—Elizabeth D. Wood
Attorney, Agent, or Firm—Finnegan, Henderson, Farabow, Garrett & Dunner, L.L.P.

[57] ABSTRACT

An olefin polymerization catalyst system comprising a complex having the general formula I or II:

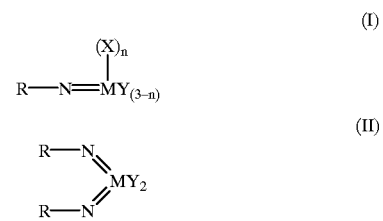

wherein in formula (I) M is V, Nb or Ta and in formula (II) M is Cr, Mo or W; R is selected from alkyl and aryl, and in formula II the R groups may be the same or different; X is an organic group containing a cyclopentadienyl nucleus, Y is a univalent anionic ligand, the Y groups may be the same or different; n is 0 or 1; the complex of formula (I) or (II) being supported on a substrate comprising a polyaminostyrene or a copolymer of styrene and aminostyrene.

9 Claims, No Drawings

SUPPORTED POLYMERISATION CATALYSTS

BACKGROUND OF THE INVENTION

The present application relates to Group V and VI metal complexes and in particular to their use in supported form as catalysts for the polymerisation of olefins. The invention specifically relates to the use of polymer-supported catalysts.

Catalysts comprising transition metals have been widely used for polymerisation reactions. For example bis (cyclopentadienyl) metal complexes containing zirconium or titanium have long been recognised as an important class of catalyst systems for the Ziegler-Natta polymerisation of olefins, when used with suitable cocatalysts.

Such metallocenes are becoming more and more important as catalysts which may be used to produce polymers with selected and improved properties.

Another type of transition metal complex useful as catalysts is disclosed in EP 641804A.

This reference describes novel Group V and VI metal-imido complexes, in particular chromium-imido complexes, which show promise as alternative catalysts for the polymerisation of olefins to the more established metallocene or Ziegler type catalysts.

When used in the gas phase such complexes may be suitably supported on conventional supports such as inorganic oxides (silica, alumina), magnesium halides or polymers such as polyethylene may be used as supports.

More recently both metallocenes and their cocatalysts (alumoxanes) have been supported on substrates comprising cross-linked polymeric porous resins for example see WO 95/23816 and U.S. Pat. No. 5,362,824.

SUMMARY OF THE INVENTION

We have now found that certain metal-imido complexes may be suitably supported on polyaminostyrenes or aminostyrene/styrene copolymers to dive supported olefin polymerisation catalysts which show improved activity.

Thus according to the present invention there is provided an olefin polymerisation catalyst system comprising a complex having the general formula I or II:

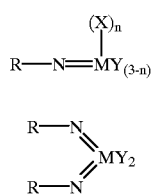

wherein in formula (I) M is V, Nb or Ta and in formula (II) M is Cr, Mo or W; R is selected from alkyl and aryl, and in formula II the R groups may be the same or different; X is an organic group containing a cyclopentadienyl nucleus, Y is a univalent anionic ligand, for example, halide, amide, hydride, alkyl or aryl, the Y groups may be the same or different; and n is 0 or 1, the complex of formula (I) or (II) being supported on a substrate comprising a polyaminostyrene or a copolymer of styrene and aminostyrene.

DETAILED DESCRIPTION OF THE INVENTION

Aminostyrenes are alternatively referred to in the art as vinyl anilines.

Preferred complexes are those wherein: in formula I above, M is vanadium, or wherein in formula II above M is chromium.

Preferred complexes are those where R is tert-butyl and Y is halide or alkyl.

Particularly preferred complexes are those of formula:

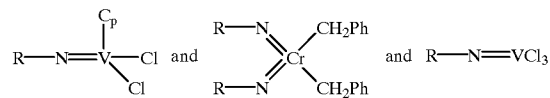

where R=tert-butyl, Cp is cyclopentadienyl and Ph is phenyl.

The supported complexes according to the present invention may be used in the presence of suitable cocatalysts for example organometallic compounds having a metal from Group Ia, IIa, IIb or IIIb of the Periodic table. Such cocatalysts are known for their use in polymerisation reactions especially the polymerisation of olefins and include organoaluminium compounds such as trialkyl, alkyl hydride, alkyl halo, alkyl alkoxy aluminium compounds or aluminoxanes.

Examples of such compounds include trimethylaluminiuin, triethylaluminium, diethyl aluminium hydride, triisobutyl aluminium, tridecyl aluminium, tridodecyl aluminium, diethyl aluminium methoxide, diethyl aluminium ethoxide, diethyl aluminium phenoxide, diethyl aluminium chloride, ethyl. aluminium dichloride, methyl diethoxy aluminium and methyl aluminoxane.

Other suitable cocatalysts for use with the complexes of the present invention include Bronsted or Lewis acids for example tris-pentafluorophenylborane and dimethylanilinium tetrakis-pentafluorophenyl borate.

In the formation of the supported catalyst system of the present invention, the complex (of formula I and II) and the polyaminostyrene or copolymer substrate are believed to undergo a ligand exchange reaction.

The use of a complex of formula I in the preparation of a supported catalyst according to the present invention is illustrated in the following reaction scheme:

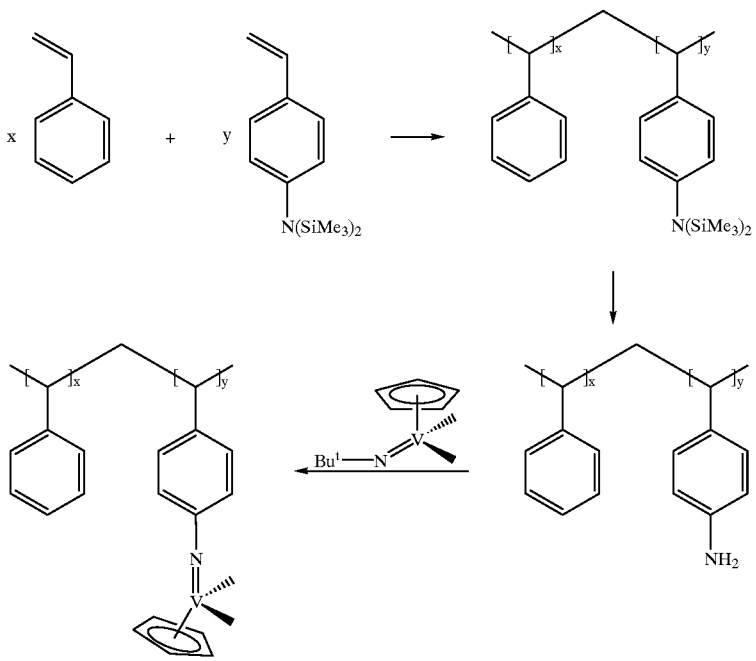

The molar ratio of the styrene component to the aminostyrene component in the copolymer is in the range 99.9:0.1 to 0:100 preferably 99:1 to 80:20.

Ortho-, meta- or para- aminostyrene isomers may be suitably used in the substrate. Para-aminostyrene is the preferred isomer.

The supported complexes may suitably be used as catalysts for the production of polyolefins in particular homopolymers of ethylene and copolymers of ethylene with alpha-olefins having 3 to 10 carbon atoms preferably 3 to 8 carbon atoms.

Suitably the alpha-olefins may be propylene, butene-1, hexene-1, 4-methyl, pentene-1 or octene-1.

The supported catalysts of the present invention are suitable for use in solution, slurry or gas phase processes.

The present invention will now be further illustrated with reference to the following Examples.

EXAMPLE 1

Preparation of $VC_p(N^tBu)Cl_2$

The complex was prepared according to the preparative route described in Z. Naturforsch, 1987, 42b, pg. 881.

EXAMPLE 2

Preparation of $V(N^tBu)Cl_3$

The complex was prepared according to the preparative route described in Z.Naturforsch. 1981, 36B, page 1130.

EXAMPLE 3

Preparation of Copolymer Support

A copolymer of styrene and 4-(N,N-bis {trimethylsilyl}amino)styrene was synthesised using an adaptation of the published literature procedure described in Macromolecules 1989, 22,Pg. 2607.

3.1 Preparation of 4-aminostyrene

A mixture of 2-(4-aminophenyl)ethanol (10 g, 73 mmol), KOH (25 g, 450 mmol) and $^t$butylcatechol (0.1 g) was heated at 240° C./40 mmHg in a flask fitted with a water-cooled condenser for 90 minutes. The contents of the flask were then distilled into a receiver vessel as a clear, 2-phase system which sodified as white crystals on standing. The solid was extracted with 50 ml diethyl ether, washed twice with 25 ml distilled water and the organic phase separated. After drying for 2 hours over NaOH pellets, the ether solution was filtered and the volatiles removed in vacuo to yield a colourless crystalline solid. Fractional distillation at 38° C. ($1 \times 10^{-2}$ mbar) yielded 4-aminostyrene. The colourless liquid was stored at −30° C. (at which temperature it is a crystalline solid) to prevent polymerisation.

3.1 Protection of Amine Functionality 3.1.1 Preparation of 4-(N-{trimethylsilyl}amino)styrene 4-aminostyrene (5.0 g, 42 mmol) was placed under nitrogen in a round-bottomed flask fitted with a water-cooled condenser, with hexamethyldisilazane (16.6 ml, 80 mmol) and trimethylsilyl chloride (0.87 g, 80 mmol). This mixture was heated to 140° C. for 16 hours and then allowed to cool. Removal of volatiles in vacuo at ambient temperature yielded a yellow viscous oil. Distillation of this at 47° C. ($1 \times 10^{-2}$ mbar) yielded 4-(N-{trimethylsilyl}amino)styrene as a colourless liquid.

3.1.2 Preparation of 4-(N,N-bis {trimethylsilyl}amino) styrene 4-(N-{trimethylsilyl}amino)styrene (3.5g, 18 mmol) in 20 ml tetrahydrofuran (thf) was added dropwise to ethylmagnesium bromide (1.0M/thf, 36.6 ml, 36.6 mmol). This mixture was heated at 60° C. for 6 hours then allowed to cool to room temperature. Trimethylsilyl chloride (6.35 g, 49 mmol) was added via syringe and the yellow solution heated to 60° C. for 16 hours. After removal of volatile components under reduced pressure, an off-white powder was obtained. Distillation of this at ($5 \times 10^{-3}$ mbar) yielded 4(N,N-bis {trimethylsilyl}amino) styrene as the only fraction. The colourless liquid product was stored at −30° C.

3.2 Copolymerisation of Styrene with 4-(N,N-bis {trimethylsily}amino)styrene

The polymerisation apparatus was dried in vacuo (1×10⁻⁵ mbar) at 200° C. for 20 minutes, allowed to cool to room temperature and maintained under dynamic vacuum for 12 hours. The apparatus was then removed from the vacuum line and thoroughly scavenged with a benzene solution of living polystyrene (initiated with sec-butyl lithium). All traces of the living polystyrene were then removed from the main part of the apparatus by repeated vacuum transfer of the benzene solvent and washing into the side arm used for storage of the living polystyrene scavenger. The apparatus was then placed under dynamic vacuum and transferred to an inert atmosphere drybox. 4-(N,N-bis{trimethylsilyl}amino)styrene (0.18g, 0.68 mmol) was placed into the apparatus via pipette, followed by vacuum transfer of tetrahydrofuran (ca. 50 ml) and styrene (1.58 g, 15 mmol). This solution was maintained under a nitrogen atmosphere at −78° C. and the polymerisation was initiated with a 0.1 M tetrahydrofuran solution of sodium naphthalenide. The resulting clear orange solution was maintained at −78° C. for 60 minutes and subsequently allowed to warm to room temperature over 30 minutes. The polymerisation was terminated by injection of 5 ml of degassed methanol. The copolymer was precipitated from a large excess of methanol, collected by filtration and dried in vacuo overnight. The copolymer prepared comprised 4.5 mole % of the aminostyrene.

Deprotection of the Amine Functionality

The copolymer was dispersed in a tetrahydrofuran/methanol mixture and excess 2 M methanolic HCl was added dropwise to acidify. This suspension was poured into a large excess of diethyl ether and the copolymer isolated by filtration. The solid was redispersed in a methanol/tetrahydrofuran solution containing a 5-fold excess of KOH over the hydrochloride copolymer. The mixture was then poured into a large excess of distilled water containing triethylamine. The resultant solid was collected by filtration and dried overnight in vacuo at 50°

EXAMPLE 4

The procedure of Example 3 was repeated using 2.0 g (0.021 moles) styrene and 0.25 g (0.0009 moles) aminostyrene to give a copolymer comprising 4.1 mole % of aminostyrene.

EXAMPLE 5

The procedure of Example 3 was repeated using 4.37 g (42 mmoles) styrene and 0.75 g (2.8 mmoles) aminostyrene to give a copolymer comprising 6.3 mole % of aminostyrene.

EXAMPLE 6

Preparation of Polymer-Supported Catalysts 6.1.1 Supported $VC_p(N^tBu)Cl_2$

The styrene/aminostyrene copolymer prepared according to Example 3 (0.148 g, 0.057 mmol aminostyrene) and $VC_p)(N^tBu)Cl_2$ (0.032, 0.124 mmol) were mixed as solids and suspended in 50 ml toluene (or 1,2-dichloroethane) and stirred at 80° C. for 9 days. The resultant deep green solid was isolated by filtration, washed with toluene (3×25 ml) and dried in vacuo.

6.1.2. Supported $VC_p(N^tBu)Cl_2$

The procedure of 6.1.1 was repeated using the copolymer prepared in Example 5.

6.2. Supported $V(N^tBu)Cl_3$

The styrene/aminostyrene copolymer prepared according to Example 4 (0.3 g, 0.12 mmol aminostyrene) and $VN^tBuCl_3$(0.057 g, 0.25 mmol) were mixed as solids and suspended in 50 ml 1,2-dichloroethane and stirred at 80° C. for 12 hours. The resultant deep red/burgundy solid was isolated by filtration, washed with 1,2-dichloroethane (3×25 ml) and dried in vacuo.

EXAMPLE 7

Polymerisation of Ethylene Using Supported $VC_p(N^tBu)Cl_2$

Activities are calculated with respect to the aminostyrene content of the copolymer used and assume complete exchange of the metal complex onto the support. A stainless steel 1-litre autoclave was pre-dried by setting the water-cooling jacket at 85° C. for a minimum of 60 minutes under a constant flow of nitrogen. The vessel was then charged with 500 ml of iso-butane and 2.3 ml of 1.0M diethylaluminium chloride as scavenger. This mixture was allowed to equilibrate at 50° C. for 60 minutes and 10 barg over pressure of ethylene was added. A suspension of supported $VC_p(N^tBu)Cl_2$ (150 mgs) in 20 ml toluene containing 2.3 ml of 1.0M diethylaluminium chloride was placed into the injection unit via cannula and injected into the autoclave using a back pressure of nitrogen. The reactor was maintained at constant pressure for 60 minutes by adding ethylene. After this time the polymerisation was terminated by halting the ethylene flow and venting the contents of the autoclave. The resultant polymer (1.35 g) was washed with acidified methanol, followed by a 1:1 ethanol/water mixture and dried in vacuo. The activity was determined to be 30.4 gmmol⁻¹V hr⁻¹bar⁻¹.

EXAMPLE 8

Polymerisation of Ethylene Using Supported $V(N^tBu)Cl_3$

A polymerisation was carried out as in Example 7, using supported $V(N^tBu)Cl_3$(55 mgs) suspended in 17 ml toluene containing 2.0 ml of 1.0M diethylaluminium chloride as the catalyst. The scavenger employed was 2 ml of 2.0M trimethylaluminium in hexanes. The work-up procedure of the resulting polymer (2.54 g) was carried out as in Example 7. The activity was determined to be 12.7 gmmol⁻¹Vhr⁻¹bar⁻¹.

EXAMPLES 9–13

Polymerisations of Ethylene

Further polymerisations were carried out using the procedure described in Example 7.

EXAMPLE 14 (Comparative)

The polymerisation of Example 7 was repeated using the unsupported catalyst ($VC_p(N^tBu)Cl_2$ to give an activity of 5000 gmol⁻¹V hr⁻¹bar⁻¹ which represents an activity clearly inferior to that using the supported catalyst according to the present invention.

Full details of all the polymerisation conditions etc. are given in the following Table.

TABLE

| Example | Catalyst Precursor (mmol) | mole % of Aminostyrene* | Activator (mol equiv) | Ethylene Pressure (bar) | Temp (0° C.) | Time (min) | Yield (PE) (g) | Activity (gmmol$^{-1}$ V hr$^{-1}$ bar$^{-1}$) |
|---|---|---|---|---|---|---|---|---|
| 7  | A | 4.5 | DEAC (40)  | 10 | 50 | 70 | 17.35 | 30.4 |
| 8  | B | 4.1 | DEAC (80)  | 10 | 50 | 60 | 2.54  | 12.70 |
| 9  | A | 6.3 | DEAC (34)  | 10 | 50 | 60 | 10.81 | 7.72 |
| 10 | A | 6.3 | DEAC (34)  | 10 | 75 | 60 | 1.92  | 1.37 |
| 11 | A | 6.3 | MAO (1000) | 10 | 50 | 60 | 11.40 | 8.14 |
| 12 | A | 6.3 | DEAC (34)  | 15 | 50 | 60 | 17.18 | 8.18 |
| 13 | A | 6.3 | EADC (42)  | 10 | 50 | 60 | 5.61  | 4.01 |
| 14 | C | —   | DEAC (40)  | 10 | 50 | 60 | 1.03  | 0.68 |

NOTES.
A = Supported $VC_pN^tBuCl_2$.
B = Supported $VN^tBuCl_3$.
C = Unsupported $VC_pN^tBuCl_2$.
DEAC is diethylaluminium chloride.
MAO is methylalumoxane.
EADC is ethylaluminiumdichloride.
*Refers to the protected monomer.

The following Examples relate to the preparation of cross-linked polyaminostyrene (ie., polyvinylaniline) resins which are cross-linked through the presence of divinylbenzene units on the polymer.

EXAMPLE 15

15.1 Preparation of a copolymer of styrene, divinylbenzene (DVB) and vinylaniline-$^t$BOC.

Styrene (1.3 ml, 11.0 mmol), divinylbenzene (0.57 ml, 3.7 mmol) and $^t$BOC- protected vinylaniline (0.154 g, 0.7 mmol) were dissolved in 2.4 ml chlorobenzene (1.33 ml/g of monomer). The initiator AIBN (0.036 g, 2 mol %) was then added. "$^t$BOC-" indicates tertiary-butoxycarbonyl. AIBN is azobisisobutyronitrile.

The medium in which the monomer was suspended for the polymerisation consisted of 100 ml water in which 0.1 g calcium orthophosphate, 0.2 g calcium sulphate and 0.75 g polyvinylpyrrolidone were suspended. The suspension polymerisation was carried out in a conventional manner using a stirring speed of 200 rpm and a polymerisation time of 15 hours. Yield: 96% of solid polymeric beads.

15.2 Deprotection of the Amine Functionality with Hydrochloric Acid

To 0.1 g of the protected copolymer (0.04 mmol amine functionality), a solution of 0.5 ml aqueous hydrochloric acid (12.6 M) in 5 ml THF was added and left in an ultrasonic bath for 60 minutes at room temperature. The residue was recovered by dilution with methanol, filtration and repeated washing with methanol. Finally the solid was dried in vacuo. Yield: 96% of polymeric beads.

15.3 Deprotection of the Amine Functionality with TMSCl

To 3.6 g of protected copolymer (1.45 mmol amine functionality), a solution of 1.27 ml (10.0 mmol) trimethylsilylchloride in 2.5 ml chloroform and a solution of 2.82 g (30 mmol) phenol in 7.5ml chloroform were added and left in an ultrasonic bath for 40 min at room temperature. The residue was recovered by dilution with methanol, filtration and repeated washing with methanol. Finally the solid was dried in vacuo. Average yield: 98% of polymeric beads.

15.4 Preparation of the Supported Procatalyst a) Preparation of copolymer-N=$VCl_3$ To a Schlenk flask containing 0.503 g (0.02 mmol) of copoly(styrene-DVB-vinylaniline) was added excess tert-butylimidovanadium trichloride. Toluene ( 15 ml) was then added via a cannular. The Schlenk vessel was flushed thoroughly with nitrogen, sealed, heated slowly to 80° C. and left to react under constant stirring for nine days.

The mixture was allowed to cool down to room temperature without further stirring. The solvent was filtered off by a cannular filter and the residue washed with toluene until the filtrate was colourless. Finally the solid product was dried in vacuo.

b) Preparation of copolymer-N=$VC_pCl_2$

To a Schlenk flask containing 0.493 g (0.02 mmol) of copoly(styrene-DVB-vinylaniline) was added excess tert-butylimidovanadium trichloride. Toluene (15 ml) was then added via cannular. The Schlenk was flushed thoroughly with nitrogen, sealed, heated slowly to 80° C. and was left to react under constant stirring for nine days.

The mixture was allowed to cool down to room temperature without further stirring. The solvent was filtered off by a cannular filter and the deep green residue washed with toluene until the filtrate was colourless. Finally the solid product was dried in vacuo.

15.5 Polymerisation of Ethylene a) Polymerisation of Ethylene with copolymer-N=$VC_pCl_2$ In a Schlenk vessel containing 0.247 g of the supported pro-catalyst suspended in 10 ml toluene, 1.08 ml (1.97 mmol) of a 1.8 M solution of diethylaluminium chloride was added. The mixture was degassed under reduced pressure and the Schlenk back-filled with an atmosphere of ethylene. The catalyst solution was then stirred vigorously at 25° C. under 1 atmosphere ethylene gas for 60 minutes. The polymerisation was then quenched by the addition of dilute HCl solution and this mixture was stirred for 1 hour. Standard work-up yielded polyethylene as a white solid. Yield 2.082 g. Activity 10.7 g/mmol/h/bar.

b) Polymerisation of Ethylene with copolymer-N=$VCl_3$

In a Schlenk vessel containing 0.229 g of the supported pro-catalyst suspended in 10 ml toluene, 1.01 ml (1.82 mmol) of a 1.8 M solution of diethylaluminium chloride was added. The mixture was degassed under reduced pressure and the Schlenk back-filled with an atmosphere of ethylene. The catalyst solution was then stirred vigorously at 25° C. under 1 atm ethylene gas for 60 minutes. The polymerisation was then quenched by the addition of dilute HCl solution and this mixture was stirred for 1 hour. Standard work-up yielded polyethylene as a white solid. Yield 2.082 g. Activity 10.7 g/mmol/h/bar.

We claim:

1. An olefin polymerisation catalyst system comprising a complex having the general formula I or II:

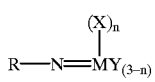  (I)

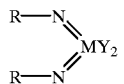  (II)

wherein in formula (I) M is V, Nb or Ta and in formula (II) M is Cr, Mo or W; R is selected from alkyl and aryl, and in formula II the R groups may be the same or different; X is an organic group containing a cyclopentadienyl nucleus, Y is a univalent anionic ligand, the Y groups may be the same or different; n is 0 or 1; the complex of formula (I) or (II) being supported on a substrate comprising a polyaminostyrene or a copolymer of styrene and aminostyrene.

2. A catalyst as claimed in claim 1 wherein the complex has the formula

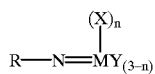

wherein M is vanadium.

3. A catalyst as claimed in claim 1 wherein the complex has the formula

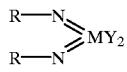

wherein M is chromium.

4. A catalyst as claimed in claim 1 wherein the univalent anionic ligand, is selected from halide, amide, hydride, alkyl or aryl.

5. A catalyst as claimed in claim 1 wherein the complex has the formula selected from

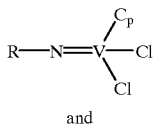

and

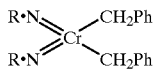

and

wherein R is tertiary butyl, $C_p$ is cyclopentadienyl and Ph is phenyl.

6. A catalyst as claimed in claim 1 wherein the supported complex is used in the presence of a cocatalyst.

7. A catalyst as claimed in claim 6 wherein the cocatalyst is selected from trimethylaluminium, triethylaluminium, diethyl aluminium hydride, triisobutyl aluminium, tridecyl aluminium, tridodecyl aluminium, diethyl aluminium methoxide, diethyl aluminium ethoxide, diethyl aluminium phenoxide, diethyl aluminium chloride, ethyl aluminium dichloride, methyl diethoxy aluminium and methyl aluminoxane.

8. A catalyst as claimed in claim 6 wherein the cocatalyst is trispentafluorophenylborane or dimethylanilinium tetrakis-pentafluorophenyl borate.

9. A catalyst as claimed in claim 1 wherein the support is a copolymer of styrene and aminostyrene having a styrene to a aminostyrene molar ratio in the range 99:1 to 80:20.

* * * * *